United States Patent Office 2,847,469
Patented Aug. 12, 1958

2,847,469

METHOD OF MANUFACTURE OF RP(O)Cl₂ FROM RP(O)(OR)₂ AND SOCl₂

Thomas P. Dawson, Bel Air, Md., and Jack W. Armstrong, Concord, Calif., assignors to the United States of America as represented by the Secretary of the Army No Drawing. Application April 26, 1955
Serial No. 504,127

4 Claims. (Cl. 260—543)

(Granted under Title 35, U. S. Code (1952), sec. 266)

The invention described herein may be manufactured and used by or for the Government of the United States of America for governmental purposes without the payment to us of any royalty thereon.

The object of this invention is to produce an alkyl phosphonic chloride. More specifically, the object is to produce an alkyl phosphonic dichloride by reacting a corresponding phosphonate with thionyl chloride.

The preparation of alkyl phosphonic dichlorides in high yields has heretofore been somewhat difficult. Several methods have been used with varying results. The following equations illustrate some of these prior art reactions:

(1)
$$CH_3-\overset{O}{\underset{OR}{\overset{\|}{P}}}-OR + 2PCl_3 + 2Cl_2 \xrightarrow{(70-80°C.)}$$

$$CH_3-\overset{O}{\underset{Cl}{\overset{\|}{P}}}-Cl + 2POCl_3 + 2RCl$$

(where R is an alkyl group)

In this reaction, POCl₃ remains with the reaction product and separation is difficult.

(2)
$$CH_4 + PCl_3 \xrightarrow[\text{press.}]{\text{Temp.}} CH_3P\overset{Cl}{\underset{Cl}{\diagdown}} + HCl$$

$$2CH_3P\overset{Cl}{\underset{Cl}{\diagdown}} + O_2 \longrightarrow 2CH_3\overset{O}{\underset{Cl}{\overset{\|}{P}}}\overset{Cl}{\diagdown}$$

(3)
$$CH_4Cl + PCl_3 + AlCl_3 \longrightarrow \left[CH_3P\overset{Cl}{\underset{Cl}{\diagdown\!\!\!\diagup}}Cl\right]^+ \left[AlCl_4\right]^-$$

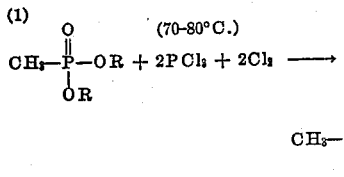

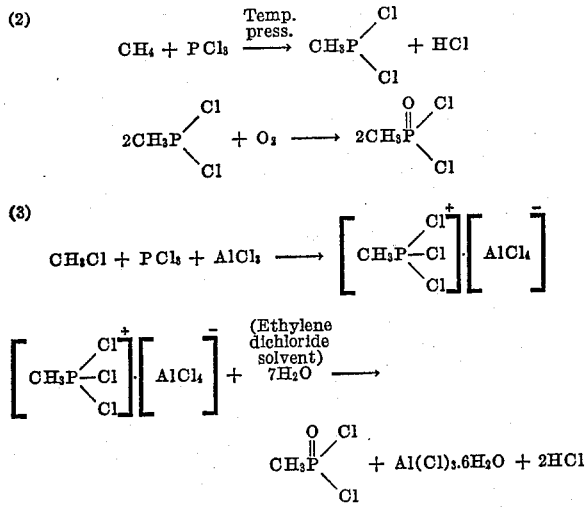

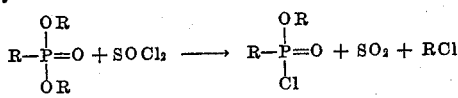
$+ Al(Cl)_3 \cdot 6H_2O + 2HCl$

In the present process, the phosphonate is reacted with thionyl chloride as follows:

$$R-\overset{OR}{\underset{OR}{\overset{|}{P}}}=O + SOCl_2 \longrightarrow R-\overset{OR}{\underset{Cl}{\overset{|}{P}}}=O + SO_2 + RCl$$

where R represents alkyl groups.

This reaction is readily obtained under ordinary conditions by the reaction of 30% molecular excess of SOCl₂ and refluxing for 3 hours at 75–80° C. When using 110% molecular excess of SOCl₂ a higher yield of the monochloride was obtained but no appreciable quantity of the dichloride resulted.

To prepare the dichloride in accordance with the following equation:

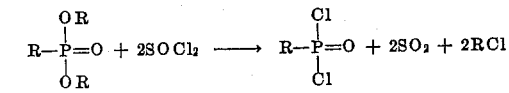

requires a higher temperature. Thus at 130 to 200° C. in an electrically heated column a 65 to 75% yield is secured without column fractionation.

*Example.*—1.0 mol SOCl₂ is placed in a flask and is heated to a refluxing temperature of 78° C. The flask is fitted with an 18″ electrically heated column containing a packing of ¼″ Berl saddles. 0.25 mol diisopropyl methylphosphonate is added at a definite rate through the column which is heated to a reaction temperature of 130 to 200° C.

The phosphonate is completely chlorinated to the corresponding dichloride in accordance with the following equation:

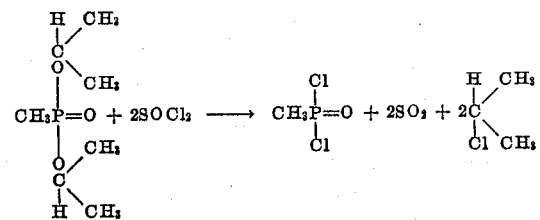

The by-products, SO₂ and isopropyl chloride escape from the top of the column and are collected in traps cooled in a Dry Ice-acetone mixture. Thus the preparation of the dichloride and its separation from the by-products of the reaction is accomplished in one convenient step.

Yields of 80% or better are obtained of a very pure product, methylphosphonic dichloride, which was once distilled and analyzed with the following results:

M. P.—32.4–32.6 (M. P. of pure material 32.7° C.)
Cl—53.76; 53.36 (calculated)
P—23.11; 23.31 (calculated)

The alkyl phosphonic dichlorides have many uses, one of the most common being that of an intermediate in the following reaction:

$$CH_3\overset{O}{\underset{Cl}{\overset{\|}{P}}}\overset{Cl}{\diagdown} + 2HF \longrightarrow CH_3\overset{O}{\underset{F}{\overset{\|}{P}}}\overset{F}{\diagdown} + 2HCl$$

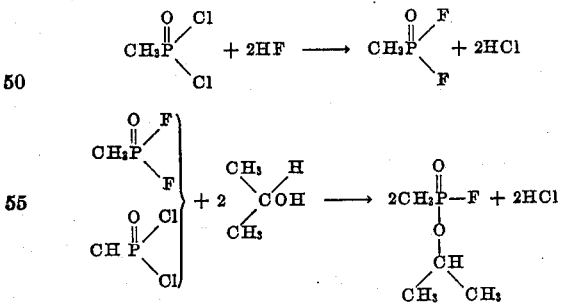

The final product is known as isopropyl methylphosphonofluoridate. It has well known toxic properties as a war gas.

We claim:
1. A process of producing an alkylphosphonic dichloride which comprises refluxing thionyl chloride at a temperature of substantially 78° C., passing vapors of said thionyl chloride up a column heated to a temperature in the range 130° to 200° C., and feeding a lower dialkyl alkylphosphonate down said column.
2. A process as defined in claim 1 wherein said phosphonate is a lower dialkyl methylphosphonate.

3. A process in accordance with claim 1 wherein the by-products of SO$_2$ and alkyl chloride are collected in cooled traps after passing up through the column.

4. A process of producing methylphosphonic dichloride which comprises refluxing thionyl chloride at a temperature of substantially 78° C., passing vapors of said thionyl chloride up a column heated to a temperature in the range 130° C. to 200° C., and feeding diisopropyl methylphosphonate down said column.

References Cited in the file of this patent

UNITED STATES PATENTS

| | | |
|---|---|---|
| 2,566,194 | Hagemeyer et al. | Aug. 28, 1951 |
| 2,632,768 | Coover et al. | Mar. 24, 1953 |